United States Patent
Smith

(10) Patent No.: US 7,194,418 B2
(45) Date of Patent: Mar. 20, 2007

(54) METHODS AND SYSTEMS FOR DYNAMIC DETERMINATION OF THE NUMBER OF TICKETS AVAILABLE FOR PURCHASE

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 09/770,811

(22) Filed: Jan. 26, 2001

(65) Prior Publication Data

US 2002/0103849 A1    Aug. 1, 2002

(51) Int. Cl.
*G06Q 10/00* (2006.01)
(52) U.S. Cl. .......................................... 705/5
(58) Field of Classification Search ................ 705/5, 705/6, 7; 709/201, 218
See application file for complete search history.

(56) References Cited

U.S. PATENT DOCUMENTS

| | | | | |
|---|---|---|---|---|
| 5,897,620 | A * | 4/1999 | Walker et al. | 705/5 |
| 6,107,932 | A * | 8/2000 | Walker et al. | 340/5.22 |
| 6,307,572 | B1 * | 10/2001 | DeMarcken et al. | 345/763 |
| 7,110,960 | B2 * | 9/2006 | Phillips et al. | 705/10 |

FOREIGN PATENT DOCUMENTS

WO    WO 97/17680    * 5/1997

OTHER PUBLICATIONS

No author, Fare play, Oct. 18, 1998; Sunday Times (United Kingdom); dialog copy 6 pages.*
No author; Web Ventures Announces Version 4 of 'BookIt! PRO'—Gives Full Travel Agent Access to Airline Computer Reservations Systems over the Internet; Oct. 5, 1998; PR Newswire, dialog copy 2 pages.*
Fisher, Eric; Cheapest seat in town price to vary; Washington Times, Nov. 26, 2002, internet copy 3 pages.*

* cited by examiner

*Primary Examiner*—Thomas A. Dixon
(74) *Attorney, Agent, or Firm*—Patterson & Sheridan, LLP

(57) ABSTRACT

A system and method for determining the availability of a restricted class of tickets is provided. In one embodiment, an initial number of restricted tickets are made available for purchase. Purchase orders are received and processed by an event server. The event server is configured to assess the volume of sales and determine whether sales meet expectations. If expectations are not met, the server takes steps to change the availability of restricted tickets. Further, embodiments of the invention provide methods and systems for determining the optimal selling price and availability of restricted tickets based on revenue goals, supply/demand, event capacity, and other factors.

37 Claims, 5 Drawing Sheets

METHODS AND SYSTEMS FOR DYNAMIC DETERMINATION OF THE NUMBER OF TICKETS AVAILABLE FOR PURCHASE

BACKGROUND OF THE INVENTION

1. Field of the Invention

The present invention relates to information processing. More particularly, the invention relates to systems and methods for determining ticket availability and/or price.

2. Background of the Related Art

Entry to fee-based events often requires a ticket. A person interested in attending a particular event may purchase the ticket in advance through some authorized vendor. Having purchased a ticket(s) the customer is guaranteed entry to the event. The ticket is then redeemed at the event and the customer is permitted to participate in the event.

One problem with conventional methods of purchasing tickets for various events is that some customers are unwilling to pay the relatively high prices demanded by event sponsors. Accordingly, sponsors have given consumers more flexibility when purchasing tickets in order to create a higher demand (and thus higher revenue from sales). For example, some tickets may be refundable and carry a premium for the option to refund the ticket. Thus, a purchaser may choose, for example, between a refundable full fare airline ticket and a non-refundable reduced fare ticket. A more price conscious consumer may opt for the reduced fare ticket and risk not being able to use it for the specified event and on the specified date.

While providing ticket options flexibility benefits both the purchaser and seller, the seller remains unable to ensure an optimized result in terms of revenue generation. That is, the seller is forced to determine a price for the tickets based on an estimate of the volume of sales at the outset (i.e., prior to releasing the tickets to the public). Once the tickets are made available to the public, the seller is then left at the mercy of the market.

SUMMARY OF THE INVENTION

Methods, systems and article of manufacture are provided for determining availability of a restricted class of tickets. The restricted class of tickets have at least one limitation associated therewith not associated with unrestricted tickets.

In one embodiment a system for providing ticket information to a plurality of client computers via a network connection is provided. The system comprises a database in communication with an event server. The database contains ticket information for at least restricted tickets, the ticket information comprising at least availability information and price information. An event server in communication with the database is configured to access the database and dynamically determine a number of the restricted tickets to make available for purchase in response to purchase orders received from the plurality of client computers. In addition, the event server is configured to respond to the purchase orders received from the plurality of client computers.

In another embodiment, a signal bearing medium contains a program which, when executed by a processor, performs a method to determine availability of restricted tickets different from unrestricted tickets. The method comprises (i) processing purchase orders for the restricted class of tickets received from a plurality of client computers; (ii) assessing, after processing at least one purchase order, whether a number of the restricted class of tickets available for purchase meets a predetermined condition; and (iii) if the predetermined condition is not met, changing the number of the restricted class of tickets available for purchase to an adjusted number.

In yet another embodiment, a method is provided for operating a server computer connected to a plurality of client computers via a network, wherein the server computer is configured to determine availability of at least a restricted class of tickets for an event accessible to holders of at least one of the restricted class of tickets and an unrestricted class of tickets. The method comprises (i) determining an initial number of the restricted class of tickets to make available for purchase; (ii) receiving purchase orders for the restricted class of tickets from the plurality of client computers; (iii) assessing, after processing at least one purchase order, whether a number of remaining tickets of the restricted class of tickets meets predetermined conditions; and (iv) if the predetermined condition is not met, changing the initial number of the restricted class of tickets to an adjusted number.

BRIEF DESCRIPTION OF THE DRAWINGS

So that the manner in which the above recited features and embodiments of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A system and method for determining the availability of a restricted class (e.g., non-refundable) of tickets is provided. The tickets may be used in any number of venues including entertainment venues such as movie theatres, concerts, races, athletic events and the like. Other ticket types include transportation tickets such as airline tickets, bus tickets, etc. However, each restricted ticket has at least one limitation not associated with a non-restricted class of tickets.

In one embodiment, an initial number of restricted tickets are made available for purchase. Purchase orders are received and processed by an event server. The event server is configured to assess the volume of sales and determine whether sales meet expectations. If expectations are not met, the server takes steps to change the availability of restricted tickets. Further, embodiments of the invention provide a method and system for determining the optimal selling price and availability of restricted tickets based on revenue goals, supply/demand, event capacity, and other factors.

One embodiment of the invention is implemented as a program product for use with a computer system such as, for example, the network environment 100 shown in FIG. 1 and described below. The program(s) of the program product defines functions of the embodiments (including the methods described below with reference to FIGS. 2–4) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Figure 1:
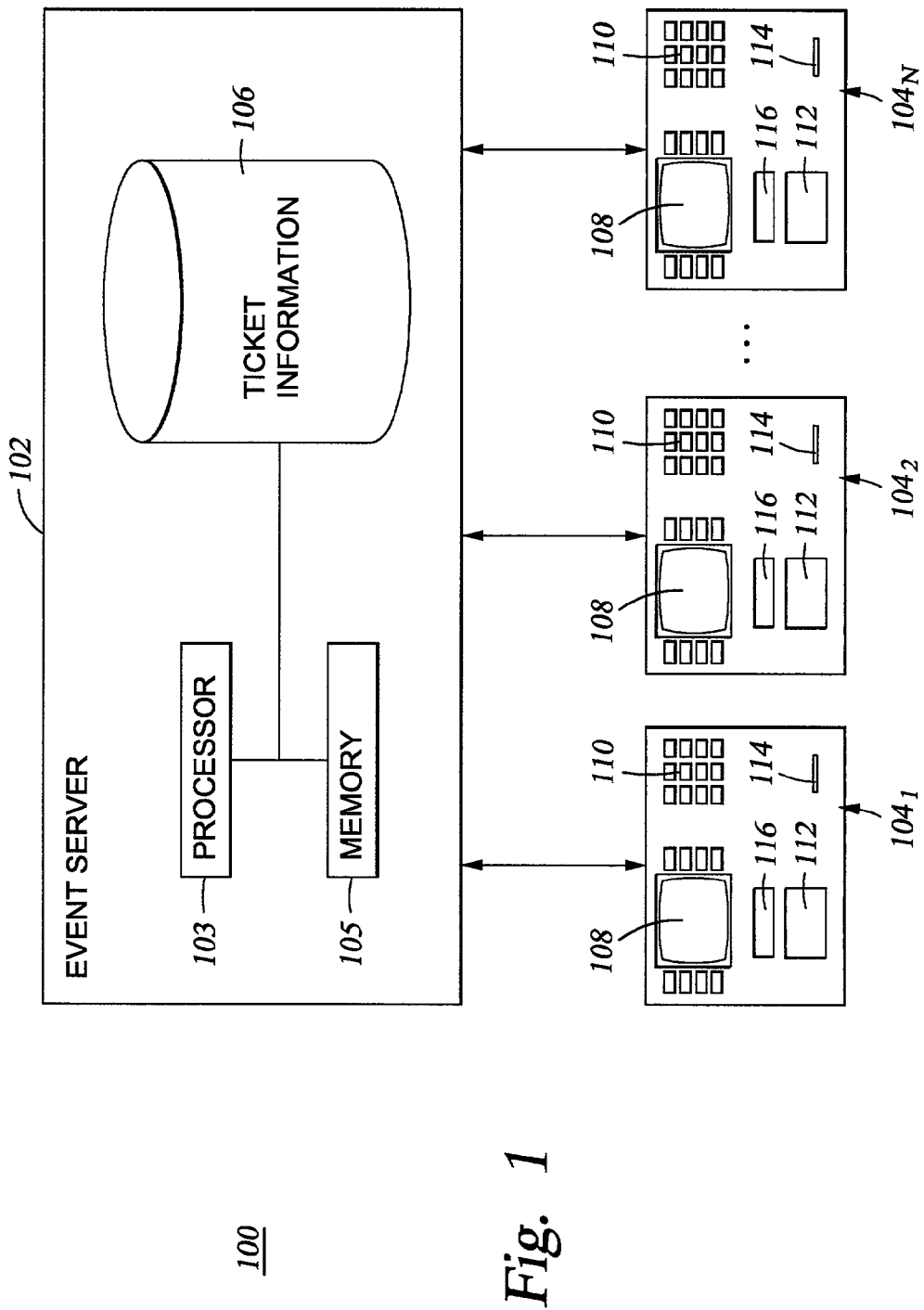
FIG. 1 is a network environment comprising an event server and a database containing ticket information.

FIG. 1 shows a network environment 100 comprising an event server 102 connected to a plurality of ticket client machines (TCMs) $104_1, 104_2, \ldots 104_N$. The event server 102 and the TCMs 104 may connected by wire, radio, fiber optic cable, or any other device or method adapted to support a network connection. In one embodiment, the event server 102 includes a processor 103, a memory 105 and a database 106. The memory is any storage device sufficiently large to hold the program structures and data structures necessary for operation. More generally, the event server 102 is any computer or computerized system configured to receive/transmit ticket information from/to the TCMs 104. The ticket information is contained in the database 106 and is accessible by the processor 103 and the memory 105. Illustratively, the ticket information pertains to the particular event, number of available seats or other occupancy constraints, current sales statistics, supply vs. demand statistics, and other relevant information. Although only one server 102 is shown, the network environment 100 may in fact include multiple servers.

The TCMs 104 are remotely located computers where at least a restricted class of tickets is made available to users interfacing with the TCMs 104. In general, the restricted tickets define a first class, or type, of ticket different from a second class/type of ticket. In this context, "restricted" means the ticket is limited by one or more restrictions that are not associated with the second class of tickets (the unrestricted tickets). Illustrative restrictions include limitations on the purchase, use, transference and return of the tickets. In one embodiment, the purchaser of a ticket has the option of buying a ticket at a regular price or buying a ticket at a reduced price. The ticket at the reduced price is non-refundable and, thus, restricted. A particular restricted ticket is a non-refundable ticket which, in addition to being non-refundable, may have other limitations associated therewith. Thus, several different types of non-refundable tickets can be offered. For example, a lowest price non-refundable ticket may be usable only at one performance, show, or event. A more expensive non-refundable ticket might be used at any show for one week. A highest priced non-refundable tickets might be usable for any single show over some extended time period longer than a week.

In a particular embodiment, the restricted ticket does not necessarily guarantee entry to the event, movie, etc., but instead places the buyer in a hold queue which may be administered by the entity sponsoring the event. The tickets in the queue are held in abeyance until one or more conditions exist at which time the holders of the restricted tickets are granted entrance to the event. In one embodiment, the restricted tickets are dated so that they may be valid for only a single event, day, etc.

In one embodiment, the TCMs 104 are stand-alone dedicated ticket dispensers that include a display screen 108, an input device 110 (which may be integrated with the display screen, as in the case of a touch screen), a ticket dispensing unit 112, a credit card reading device 114 and a cash receiving device 116. In another embodiment, the TCMs 104 are personal computers (PCs) configured with the necessary software to access the event server 102. For example, the TCMs 104 may be PCs executing a browser and the server 102 may be a Web server. The latter embodiment is an example of an Internet-based network environment used to advantage by the present invention.

While the TCMs 104 are online (i.e., powered up and maintaining a network connection with the server 102), a user/customer interacting with the TCMs 104 is presented with ticket purchasing options for various events. The options available to the customer are determined by the server 102 and provided to the TCMs 104 during a ticket purchase transaction for a given event. In one embodiment, the user may elect between the purchase of two or more ticket types, at least one of which is a restricted ticket. Additionally or alternatively, the user elects between two or more restricted tickets having different limitations/restrictions. Viewing the display device 108, the user may choose the desired ticket type and properties of the ticket type using the input device 110. Ticket availability and price are determined according to an algorithm executed by the server 102 using the ticket information contained in the database 106. The user may then confirm his purchase, change the ticket type/properties or cancel the transaction.

Once a purchase is made (for example, the customer uses a credit or smart card to confirm a purchase), a ticket is dispensed or otherwise provided to the customer. In the case where the TCM 104 is a stand-alone ticket dispenser, the ticket is dispensed from the ticket dispensing unit 112. In the case where the TCM 104 is a PC, the user may be provided with a confirmation number or other identification information indicative of the purchase. The user may then gain admittance to the event by providing the confirmation number to an attendant (e.g., a computer or a human) at the event location. In another embodiment, the ticket(s) are sent to the user via conventional mail delivery.

Figure 2:
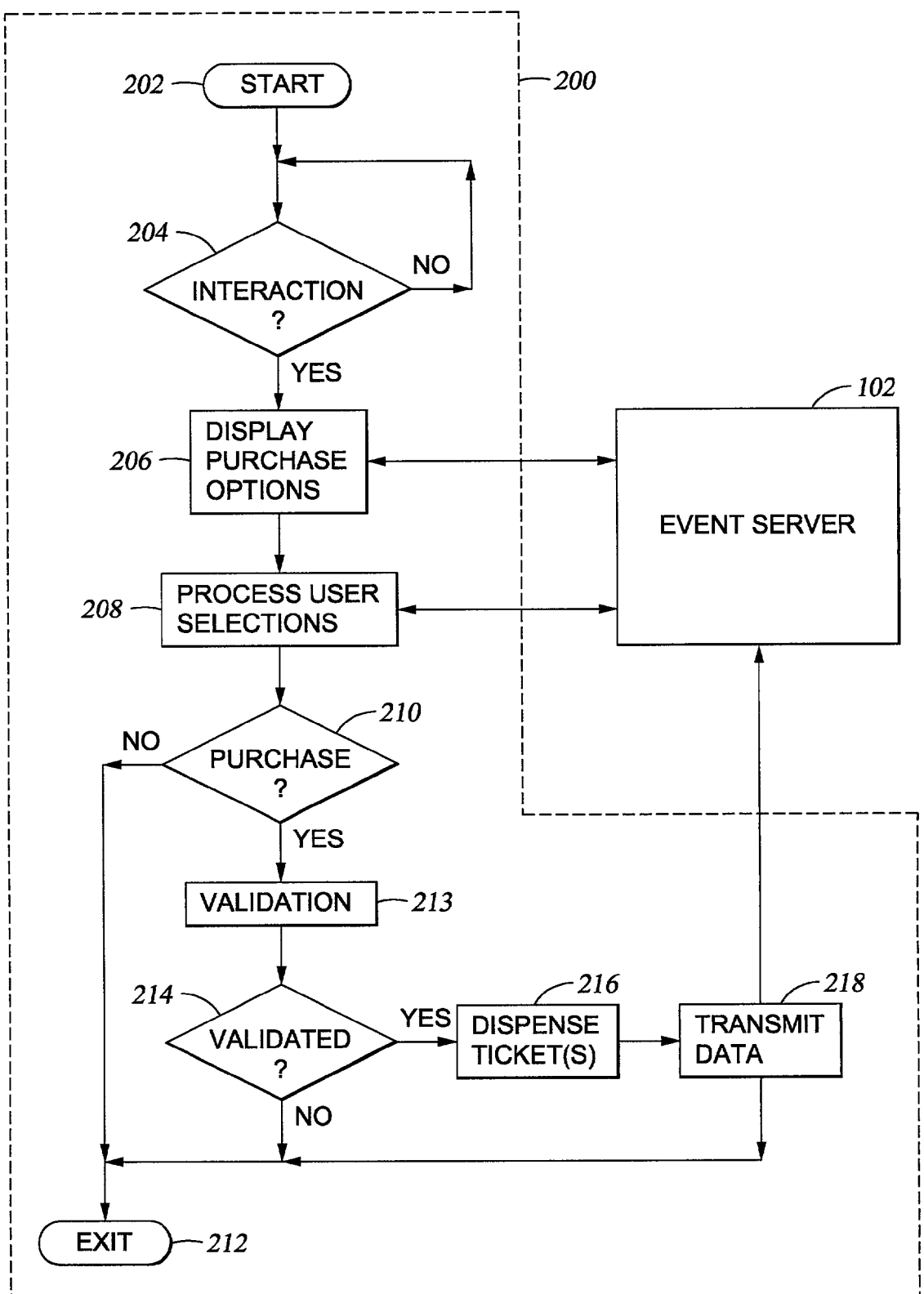
FIG. 2 is a flow chart illustrating a method for purchasing a ticket.

One embodiment illustrating the operation of a TCM 104 is shown as a method 200 in FIG. 2. For simplicity, a few assumptions are made in describing the method 200. First, a single stand-alone TCM 104 (such as the shown in FIG. 1) will be assumed. However, the same principles of operation described with reference to FIG. 2 apply to the case of multiple TCMs 104, whether stand-alone machines, PCs or other. Second, it is assumed that the TCM 104 is being operated by a user interested in buying one or more restricted class tickets. It is understood, however, that tickets of other classes, (e.g., unrestricted tickets) may be purchased using the TCM 104.

The method 200 is entered at step 202 and proceeds to step 204 where the TCM queries whether a user has initiated a purchase transaction by interacting with the TCM 104. Illustratively, this interaction might be a spoken command, a credit card swipe, or a button that is pressed. Step 204 is repeated periodically until a transaction session is initiated at which point the method 200 proceeds to step 206. At step 206 purchase options are displayed to the user. Step 206 may be a series of static text or image displays, audible output, and/or video to guide the user to a selection for tickets. In one embodiment, the options are based on data sent from the event server 102 to the TCM 104. In some embodiments, some storage may also be present on the TCM 104 which may be occasionally polled by the event server 102.

At step 208 the method 200 processes the users selections (e.g., event selection, ticket types selections, number of tickets, delivery selections, etc.) and updates the displayed information. In general, step 208 includes transmitting the user input information (e.g., ticket type and properties) from the TCM 104 to the server 102. The server 102 is configured to determine ticket availability and price. A response is then sent from the server 102 back to the TCM 104 which indicates whether the requested ticket is available and at what price. One embodiment of the method by which the event server 102 determines availability and price is described below with reference to FIG. 3.

After the user makes his or her selections, the method 200 proceeds to step 210 and queries whether the user has elected to purchase the selected ticket(s). If so, a validation process is executed at step 213. The validation process may include validation of any of the user provided information, particularly the credit card information in the case of credit card purchase. At step 214, the method 200 queries whether the validation was successful. If not, the method 200 exits at step 212. If the information is validated, the method 200 dispenses the tickets at step 216. Dispensation may involve printing and dispensing the ticket via the dispenser 112, mailing the ticket to a user-provided address, or otherwise issuing the ticket according to the user selected options. The ticket may then be used subject to the conditions/restrictions selected by the user. Illustrative restrictions are described above.

After dispensation, the sales information is transmitted from the TCM 104 to the event server 102 at step 218. Information about the sale is sent from the TCM 104 to the event server 102 and used to update database information. For example, if the number of ticket sales has exceeded some quota or threshold for the number of available seats, then only certain non-refundable tickets are made available.

The event server 102 stores information about event seating, number of total tickets of each type that are available, number of non-refundable ticket types, dates, prices, and other relevant information. For each purchase request received from a TCM 104, this information is processed according to an algorithm stored on the event server 102. One embodiment of an algorithm that is used to determine a number of non-refundable tickets made available for purchase at a TCM 104 is shown as a method 300 in FIG. 3. The method 300 is intended to be illustrative. Other methods can be used including linear programming, optimization techniques, and neural/fuzzy methods.

By way of example, the method 300 is described in the context of motion picture tickets. The method 300 may be executed upon announcement of a new movie release date. The method 300 utilizes the information stored in a data repository, illustratively the database 106 of the event server 102 (shown in FIG. 1). Such information includes the expected date when the movie will be available to the theatre, the expected fraction of people in the surrounding community who may be interested in the movie (based on previous attendance, demographics, and other factors), the number of showings per day as well as the total number of days that the movie will be at the theatre, cost of the movie to the theatre, and the like.

Method 300 is entered at step 302 and proceeds to step 304 where an estimated number of non-refundable tickets to make available is calculated. One embodiment of step 304 is described below. At step 306, the method 300 queries whether the estimated number is less than a threshold number. If not, the non-refundable tickets are made available to the TCMs 104 at step 308 and the method 300 exits at step 310. Otherwise, the method proceeds to step 312 where a negotiation for more instances of the event (e.g., shows, flights, etc.) occurs. Illustratively, this negotiation involves a request submitted from the event server 102 to the sponsor of the event. The request may specifically include a desired number of additional event instances (e.g., an additional number of showings of a particular movie, more flights for a given route/destination, etc.) or merely indicate that an increase in event instances is desired (without specifying a particular number of instances). Step 314 queries whether more event instances where successfully negotiated. If not, the method 300 exits at step 310. If more instances of the event are made available through the negotiation, the method 300 returns to step 304. The method 300 may then be continually repeated until step 306 or step 314 is answered negatively.

Returning briefly to step 304, one embodiment of a formula for calculating the initial estimated number of restricted tickets ($N_i$) to make available is provided as Equation 1.

$$Ni=(Events\_Total*Capacity)-(PAAF*PAC) \quad \text{Equation 1}$$

$Events_{13}Total$ is the total number of events that are currently scheduled. The "Capacity" is the total number of tickets available for each scheduled event. The product of Events_Total and Capacity is the total number of tickets available for all the scheduled events. PAAF is the pay-at-attendance factor, or the percent of people who will pay at the site/time of the event, e.g., last minute purchasers such as people paying at the door). In general, these people are those paying for regularly priced tickets (i.e., full price tickets). However, in some embodiments, it is possible to purchase restricted tickets at the door. PAC is the potential attendance community, or an estimated number of ticket purchasers in a target market. The product of PAAF and PAC is the total number of tickets expected to be purchased at the door. Accordingly, Equation 1 yields a surplus of available tickets after accounting for estimated unrestricted ticket purchases.

Using a movie as a particular example, if the PAAF is estimated to be 1% for a PAC of 100,000 then an estimated 10,000 people will attend the movie. If the movie will be available at the theatre for 6 weeks with 20 showings per week and a theatre audience capacity of 200 people per show, then the number of restricted tickets is first estimated as: (6*20*200)−10,000=24,000−10,000=14,000. The restricted tickets go on sale before the movie arrives at the theatre. If more than 14,000 non-refundable tickets are sold before the show opens, this benefits the theatre. They may choose to schedule more shows and/or add another theatre. If the restricted ticket sales fall below expectations and the show run cannot be shortened, then the price of the tickets can be reduced or otherwise adjusted to be more attractive (e.g., two-for-one). Ultimately, the sponsor desires to overbook the movie slightly so that all shows are filled with some contingency for factors that will change either the attendance per show and/or the number of shows (e.g., inclement weather, unexplained no-shows, etc.).

Figure 3:
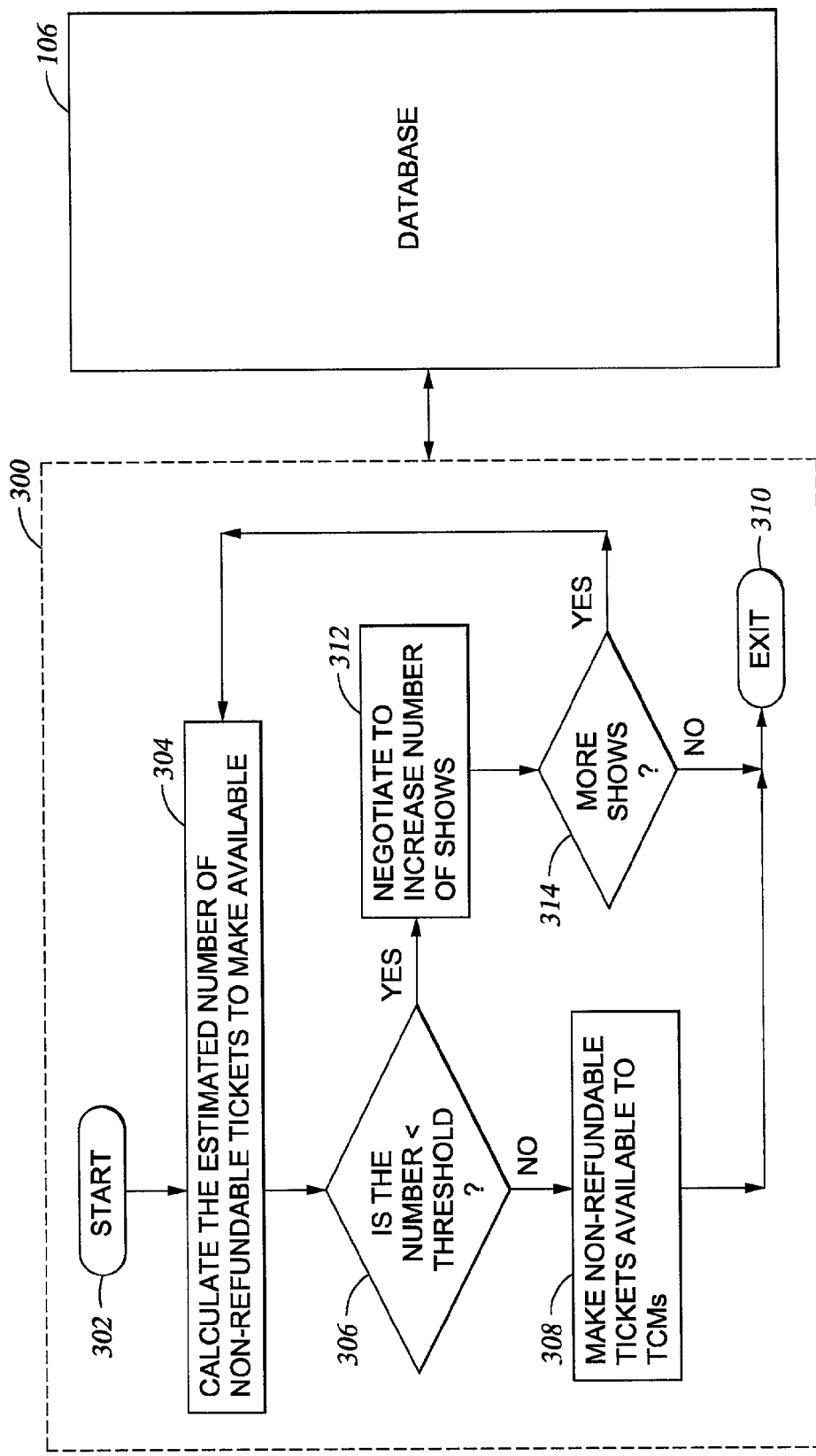
FIG. 3 is a flow chart illustrating a method for determining an initial number of tickets to make available for purchase

Following the initial method 300 shown in FIG. 3, an iterative phase follows whereby the sales of restricted tickets at the TCMs 104 are monitored by the event server(s) 102. Should ticket sales at the box office (or people who pay at the door for full-price/unrestricted tickets) fall above or below initial estimates the number of non-refundable tickets that are made available can be decreased or increased, respectively.

Figure 4:
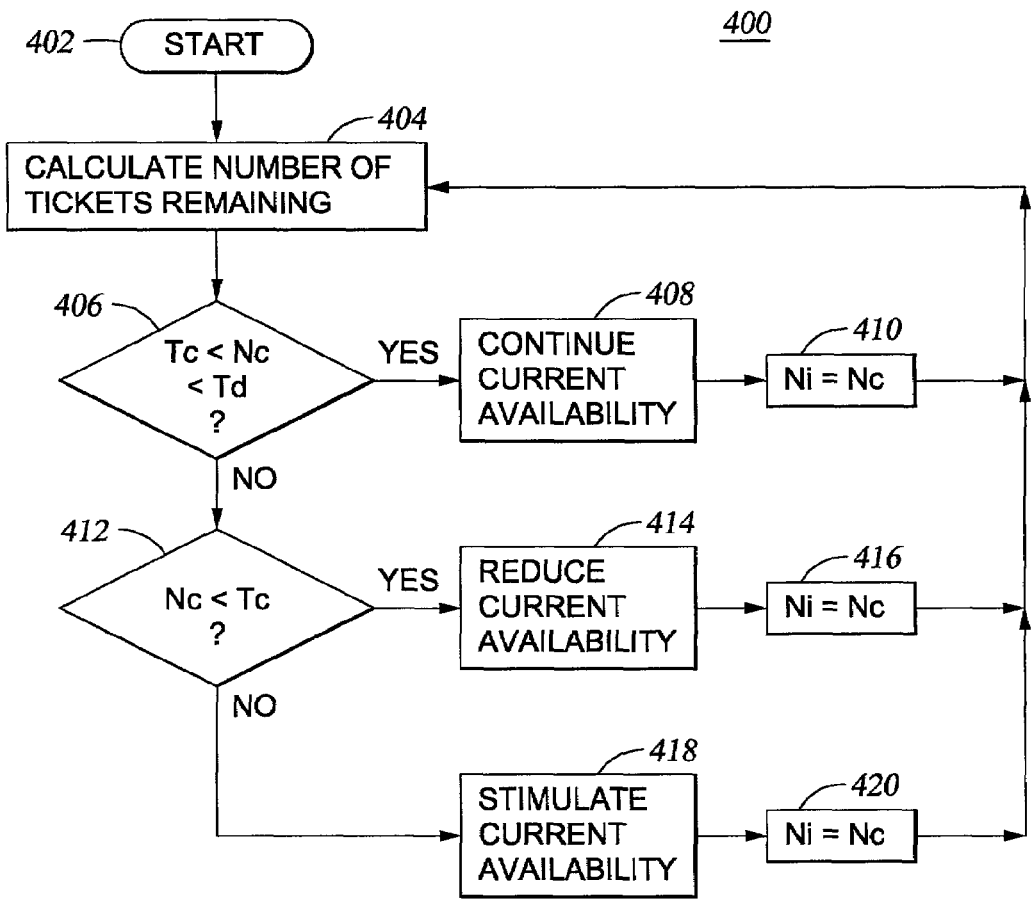
FIG. 4 is a flow chart illustrating a method for determining whether a number of available tickets for purchase will be adjusted.

FIG. 4 is one embodiment of a method 400 for adjusting the number of available restricted tickets following the initial estimate made according to the method 300. The method 400 is entered at step 402 and proceeds to step 404 where the number of remaining tickets, Nc, is updated in the records of the database(s) 106. In general, Nc may be determined according to various methods including accessing a lookup table generated according to expected sales. In a particular embodiment, Nc is the difference between the initial number of restricted tickets, Ni, and the sum of the number of tickets sold and the estimated number of tickets that will be sold in the time remaining before the event ends. For example, Nc can be defined according to Equation 2:

$$Nc = Ni - (Nsold + R*D) \qquad \text{Equation 2}$$

In Equation 2, Nsold is the total number of tickets already sold, R is the average rate of ticket sales per day and D is the number of days before the event concludes. The product of R and D is the expected ticket sales in the time remaining before the show or shows conclude. This information is available from the database 106.

At step 406, the method 400 determines whether Nc is within a predetermined target range. In FIG. 4 the step 406 is represented as Tc<Nc<Td, where Tc and Td are the minimum and maximum of the predetermined target range. Tc and Td are not constant for each iteration of method 400. Rather they reflect the desired limits for a range of tickets remaining at a given point in time relative to the time of the event. Thus, as the event closing date nears, Tc and Td will become increasingly smaller values since it is expected that ticket sales will continue until the event concludes.

If step 406 is answered affirmatively, then the availability of the restricted tickets is not changed, as represented by step 408. At step 410, the method 400 sets Ni equal to Nc and then returns to step 404 for a subsequent iteration.

If step 406 is answered negatively, the method 400 proceeds to step 412 to query whether Nc is less than the lower limit Tc. If so, then at step 414 the number of restricted tickets that are made available to the TCMs 104 is reduced in order to avoid significant overselling. The method 400 then proceeds to step 416, where Ni is set to Nc, and then returns to step 404 for a subsequent iteration.

If the queries at steps 406 and 412 are both answered negatively, then it follows that Nc is greater than Td, in which case steps are taken to stimulate ticket sales, as represented by 418. Efforts to increase ticket sales include sales promotions such as increased advertising, reduced prices or other incentives. The method 400 then proceeds to step 420, where Ni is set to Nc, and then returns to step 404 for a subsequent iteration. The method 400 may be successively repeated until no restricted tickets remain or until revenue goals are achieved.

Although FIG. 4 refers to an estimated number of the remaining tickets, a corollary to this approach is analysis of the sales volume. Thus, in another embodiment, the sales volume may be assessed with reference to predetermined criteria in making a determination of whether and how to change ticket availability.

In some embodiments the sponsor of the event may be notified with current ticket sales information. Upon notification, the sponsor may be given the opportunity to override the proposed changes to ticket availability made by the method 400.

In another embodiment, an expression of the tradeoff between the selling prices and number of restricted tickets is used to advantage. For example, Equation 3 describes the sensitivity of ticket revenue to the changes in the price and availability of both unrestricted and restricted tickets.

$$\Delta R = P_{NR} \Delta N_{NR} + N_{NR} \Delta P_{NR} + P_R \Delta N_R + N_R \Delta P_R \qquad \text{Equation 3}$$

In Equation 3, $\Delta R$ is the change in ticket revenue, $N_R$ is the number of restricted tickets sold, $N_{NR}$ is the number of unrestricted tickets sold, $P_{NR}$ is the price of an unrestricted ticket, $P_R$ is the price of a restricted ticket, and N is the total number of tickets.

Assuming that the price of an unrestricted ticket is constant ($\Delta P_{NR}=0$), then Equation 3 can be simplified to:

$$\Delta R = P_{NR} \Delta N_{NR} + P_R \Delta N_R + N_R \Delta P_R \qquad \text{Equation 4}$$

Figure 5:
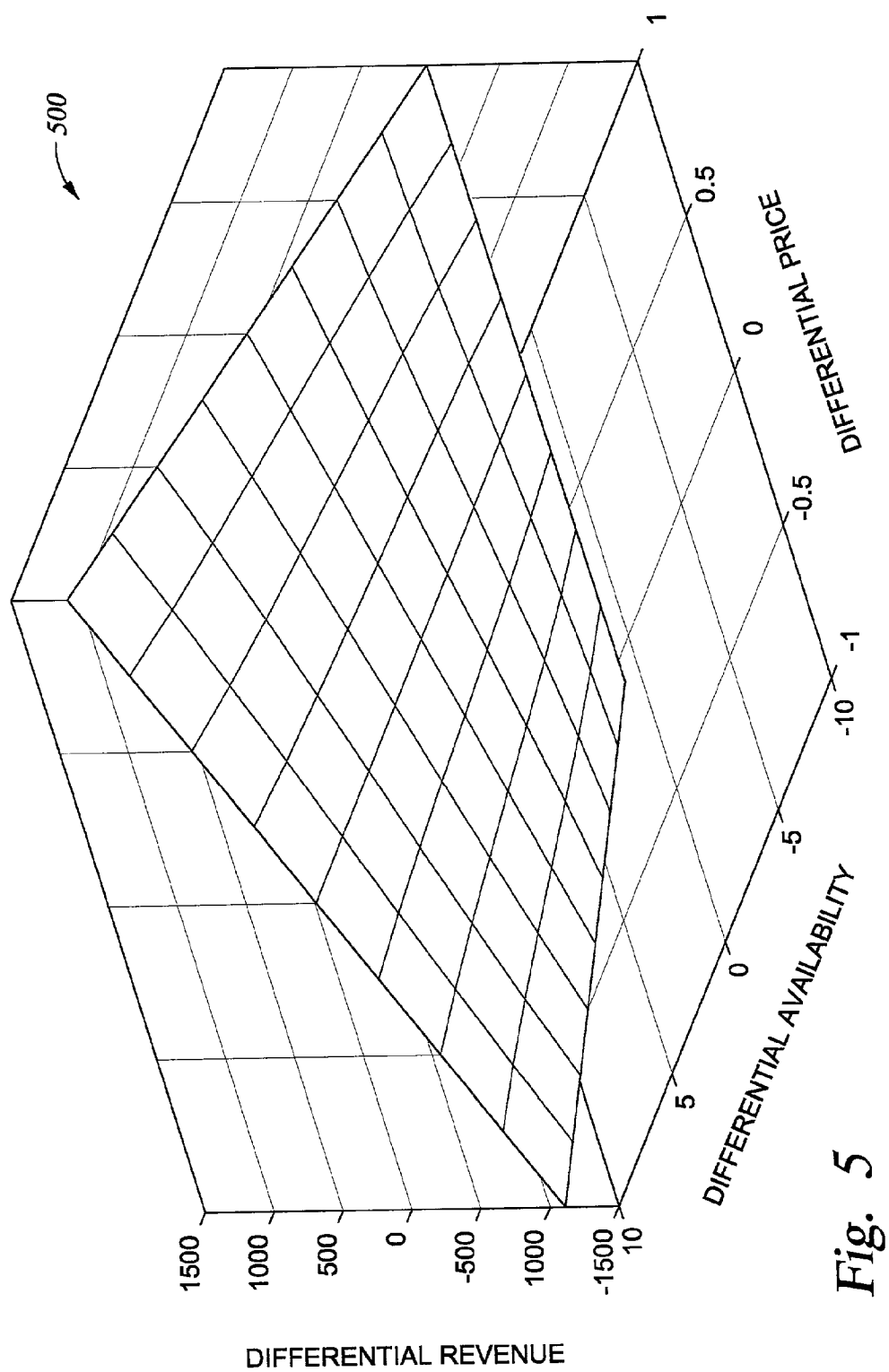
FIG. 5 is a graph illustrating the relationship between a differential number of tickets, a differential price of tickets and revenue.

Equation 4 is plotted in FIG. 5 for the case where there is no change in the number of unrestricted tickets sold (i.e., $\Delta N_{NR}=0$). $\Delta N_{NR}$ has been set to zero for ease of interpretation. It is understood that the calculations employed by the arithmetic unit of the event server 102 may use Equation 3 directly without simplifying assumptions.

FIG. 5 shows a differential revenue surface 500 which represents the sensitivity of revenue to changes in price and sales of restricted tickets. It can be determined from any given point on the surface 500 how such changes will influence revenue. In FIG. 5, the x-axis is the differential price for restricted tickets and the y-axis is the differential number of restricted ticket sold. Note that as the differential number (the rate of change) of restricted ticket sales increases, this does not necessarily lead to a differential increase in revenue if the ticket prices are dropping. A constraint equation which limits the total number of available tickets (restricted+unrestricted) must also be observed as the number of seats will be limited. In addition, a price versus sales relationship based on local competition exists.

Equations 5 and 6 provide illustrative constraints on the number of tickets and the price, respectively. Thus, for example, a constraint on the maximum number of tickets available is given by equation 5.

$$TN_R + TN_{NR} \leq \text{Events\_Total} * \text{Capacity} \qquad \text{Equation 5}$$

In Equation 5, $TN_R$ is the total number of restricted tickets that can be sold and $TN_{NR}$ is the total number of non-restricted tickets that can be sold. Events_is the total number of events that are currently scheduled and Capacity is the total number of tickets available for each scheduled event.

A constraint equation for the maximum selling price of a ticket is given in Equation 6.

$$P_R \leq \max(P_{RR}) \qquad \text{Equation 6}$$

where $P_R$ is the price of a refundable ticket and $P_{RR}$ is the regional pricing for refundable tickets.

As described herein, methods, systems and articles of manufacture are provided for increased ticket sales because a restricted class of tickets is available at a reduced price. The use of restricted/non-refundable tickets also allows sponsors of events to distribute audiences more evenly by restricting admission for some events. That is, holders of restricted tickets may not be admitted to a particular show at a particular time but instead may have to wait until a later showing. In addition, restricted tickets may not guarantee a specific seat assignment; rather the assignment is made when the ticket is processed at the event. Each of the foregoing aspects allow for greater flexibility in the sales of tickets and enable an event sponsor to ensure a capacity crowd.

Accordingly, embodiments of the invention include a stored computer program which, when executed, continually analyzes the sales of restricted and unrestricted tickets to determine their quantity and their price. This information can then be transmitted to a computer (i.e., the TCMs 104) being interfaced by a purchaser.

In one embodiment, a differential sensitivity analysis is performed to determine the optimal selling price and availability of restricted tickets based on revenue goals, supply/demand, event capacity, and other factors. Because of the readily available sales data from TCMs 104, a dynamic programming model can be employed to update the database 106 at the event servers 102.

While the foregoing is directed to the preferred embodiment of the present invention, other and further embodiments of the invention may be devised without departing from the basic scope thereof, and the scope thereof is determined by the claims that follow.

What is claimed is:

1. A system for providing ticket information to a plurality of client computers via a network connection, comprising:
    (a) a database containing the ticket information for at least restricted tickets different from unrestricted tickets, wherein both the restricted tickets and the unrestricted tickets provide access to an event and wherein the restricted tickets carry a restriction not imposed on the unrestricted tickets, and wherein the ticket information comprises at least ticket availability information and ticket price information and wherein ticket availability information comprises a number of the restricted tickets available for purchase; and
    (b) an event server configured to execute instructions for:
        (i) accessing the ticket information in the database;
        (ii) dynamically adjusting the number of the restricted tickets to make available for purchase in response to purchase orders received for both restricted tickets and unrestricted tickets, wherein the number of the restricted tickets available for purchase is adjusted without adjusting a price of the restricted tickets; and
        (iii) sending responses to the plurality of client computers for the purchase orders for the restricted tickets received from the plurality of client computers.

2. The system of claim 1, wherein the event server is further configured to execute instructions for responding to purchase orders for the unrestricted tickets.

3. The system of claim 1, wherein the event server is configured to execute instructions for responding to the purchase orders by sending at least part of the ticket information to the plurality of client computers.

4. The system of claim 1, wherein the event server is configured to execute instructions for dynamically determine determining the number of the restricted tickets available for purchase by, after receiving at least one purchase order, comparing an estimated number of remaining restricted tickets to a predetermined range of restricted tickets and changing the number of restricted tickets available for purchase when the estimated number of the remaining restricted tickets is outside of the predetermined range.

5. The system of claim 1, wherein the event server is configured to execute instructions for dynamically determine determining the number of the restricted tickets available for purchase by periodically changing the number in response to the number of purchase orders received.

6. The system of claim 1, wherein the number of remaining restricted tickets is the difference between a remaining portion of an initial number of the restricted tickets and an estimated number of the restricted tickets to be sold in a remaining time period before an event date.

7. The system of claim 1, wherein the network connection is the Internet.

8. The system of claim 1, wherein the plurality of client computers comprises a plurality of dedicated stand-alone computers configured specifically for ticket purchases.

9. The system of claim 1, wherein the restricted tickets are non-refundable and the unrestricted tickets are refundable.

10. The system of claim 1, wherein the event server is configured to execute instructions for dynamically determine determining the number of the restricted tickets available for purchase by periodically changing the number in response to the number of purchase orders received and a time period remaining before an event occurs, wherein the event is made accessible to holders of the restricted and unrestricted tickets.

11. The system of claim 10, wherein the event is made conditionally accessible to holders of the restricted tickets and unconditionally to holders of the unrestricted tickets.

12. A computer-readable storage medium containing a program which, when executed by a processor, performs a method to determine availability of a restricted class of tickets for advance purchase to gain access to an event, the restricted class of tickets being different from an unrestricted class of tickets for the event, wherein holders of either class of tickets are permitted access to the event, the method comprising:
    processing advance purchase orders for the restricted class of tickets received from a plurality of client computers;
    assessing, after processing at least one of the purchase orders, whether a remaining number of the restricted class of tickets available for purchase meets a predetermined condition; and
    when the predetermined condition is not met, changing the remaining number of the restricted class of tickets available for advance purchase to an adjusted number without changing a price of the restricted class of tickets.

13. The computer-readable storage medium of claim 12, further comprising, prior to processing the purchase orders, determining an initial number of the restricted class of tickets to make available for advance purchase.

14. The computer-readable storage medium of claim 13, wherein determining the initial number comprises:
    estimating a number of purchases of the restricted class of tickets;
    determining whether the estimated number of purchases is less than a threshold; and
    setting the initial number of the restricted class of tickets to make available equal to the estimated number when the estimated number of purchases is greater than or equal to the threshold.

15. The computer-readable storage medium of claim 14 wherein estimating the number of purchases of the restricted class of tickets is done according to a formula:

$N = (\text{Total}_{13}\text{Tickets}) - (P_{13}C)$; where N is the estimated number of purchases of the restricted class of tickets, $\text{Total}_{13}\text{Tickets}$ is a total number of tickets possible according to a capacity of the event, $P_{13}C$ is a number of purchases of the unrestricted class of tickets expected to made at the time of the event according an estimated total number of potential purchasers.

16. The computer-readable storage medium of claim 12, wherein the adjusted number is greater than the assessed number of the restricted class of tickets available for purchase when the assessed number is less than the threshold value.

17. The computer-readable storage medium of claim 12, further comprising processing purchase orders for unrestricted tickets.

18. The computer-readable storage medium of claim 12, wherein the step of assessing is done iteratively to ensure the remaining number of the restricted class of tickets available for purchase is adjusted on the basis of actual ticket sales and wherein assessing comprises:
calculating the remaining number on the basis of (i) a previous prediction of a total number of sales of the restricted class of tickets and (ii) a current prediction of a total number of sales of the restricted class of tickets, the current prediction being based on a number of the restricted class of tickets actually sold and a number of the purchase orders received and a time period remaining before an the event occurs; and determining whether the predetermined condition is satisfied.

19. The medium of claim 12, wherein the restricted tickets are non-refundable and the unrestricted tickets are refundable.

20. The computer-readable storage medium of claim 12, wherein the predetermined condition is a threshold value and wherein the adjusted number is less than the assessed number of the restricted class of tickets available for purchase when the assessed number is less than the threshold value.

21. The computer-readable storage medium of claim 20, wherein the predetermined condition varies with time.

22. A method for operating a server computer connected to a plurality of client computers via a network, wherein the server computer is configured to determine advance purchase availability of at least a restricted class of tickets for an event accessible to holders of either of the restricted class of tickets and an unrestricted class of tickets, wherein the restricted class of tickets have at least one limitation not associated with the unrestricted class of tickets, the method comprising:
determining an initial number of the restricted class of tickets to make available for advance purchase prior to the event taking place;
receiving advance purchase orders for the restricted class of tickets from the plurality of client computers;
assessing, after processing at least one purchase order, whether a number of remaining tickets of the restricted class of tickets meets predetermined conditions; and
changing the initial number of the restricted class of tickets to an adjusted number without changing a price of the restricted class of tickets when the predetermined condition is not met.

23. The method of claim 22, wherein the number of remaining tickets of the restricted class of tickets is estimated according to at least a number of tickets sold and a number of tickets expected to be sold in a remaining time period before the event.

24. The method of claim 22, wherein the predetermined condition changes with time.

25. The method of claim 22, wherein the restricted class of tickets are non-refundable and the unrestricted class of tickets are refundable.

26. The method of claim 22, wherein the at least one limitation is one of a limitation on use, transference and refund.

27. The method of claim 22, wherein receiving purchase orders from the plurality of client computers comprises receiving requests from a plurality of dedicated stand-alone computers configured specifically for ticket purchases.

28. The method of claim 22, wherein receiving purchase orders from the plurality of client computers comprises receiving requests from a plurality of personal computers connected to the server computer by a network connection.

29. The method of claim 22, wherein changing the number of the remaining tickets to make available comprises decreasing the number of remaining tickets.

30. The method of claim 22, wherein changing the number of the remaining tickets to make available comprises one of decreasing the number of remaining tickets and increasing the number of remaining tickets.

31. The method of claim 30, further comprising:
stimulating sales of the restricted class of tickets when changing the number of the remaining tickets to make available comprises decreasing the number of remaining tickets.

32. The method of claim 22, further comprising, leaving the number of remaining tickets unchanged when the number of remaining tickets meets the predetermined condition.

33. The method of claim 22, wherein determining the initial number comprises:
estimating a number of purchases of the restricted class of tickets;
determining whether the estimated number of purchases is less than a threshold; and
setting the initial number of the restricted class of tickets to make available equal to the estimated number, when the estimated number of purchases is greater than or equal to the threshold.

34. The method of claim 33, further comprising, requesting an increase in a number of instances of the event from an event sponsor when the estimated number of purchases is less than the threshold.

35. The method of claim 33, wherein estimating the number of purchases of the restricted class of tickets is done according to a formula:
$N = (\text{Total\_Tickets}) - (P\_C)$; where N is the estimated number of purchases of the restricted class of tickets, Total_Tickets is a total number of tickets possible according to a capacity of the event, P_C is a number of ticket purchases of the unrestricted class of tickets expected to made at the time of the event according an estimated total number potential purchasers.

36. The method of claim 22, wherein the step of assessing comprises periodically determining whether the number of remaining tickets is within a predetermined range.

37. The method of claim 22, wherein the step of determining the initial number is done only once for the event and the steps of assessing and changing are done periodically.

* * * * *